June 10, 1958 B. E. McARTHUR 2,838,641
INDUCTION HEATING SYSTEMS
Filed Jan. 27, 1955 2 Sheets-Sheet 1
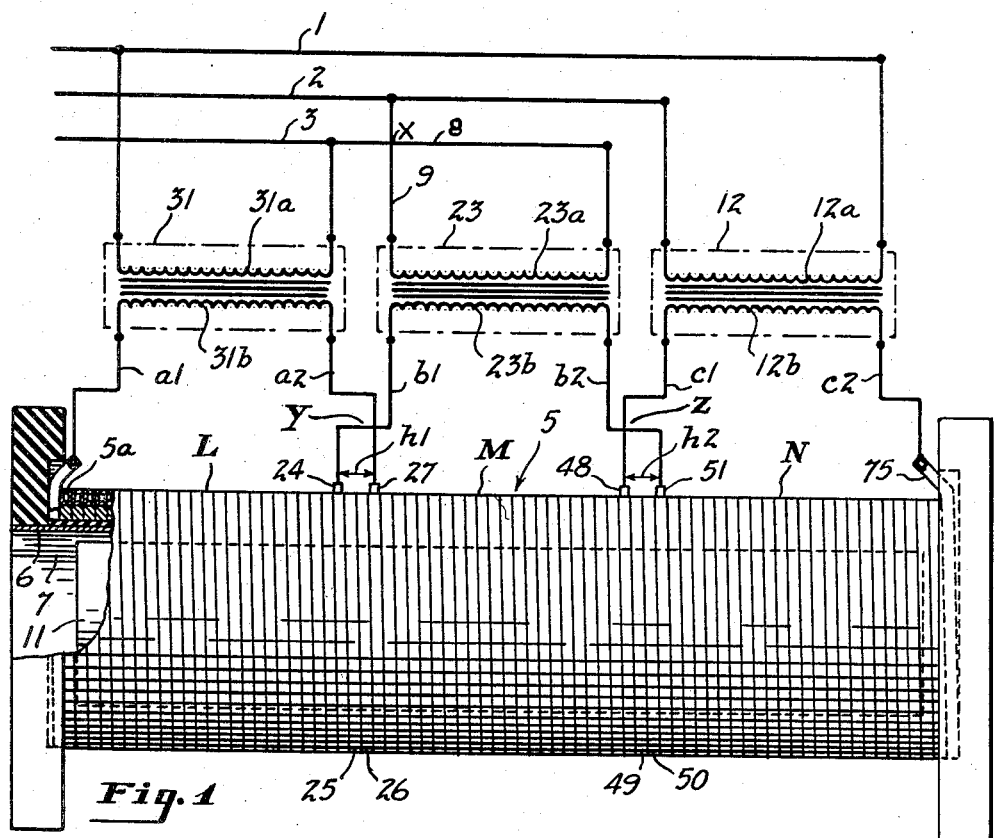
Fig. 1
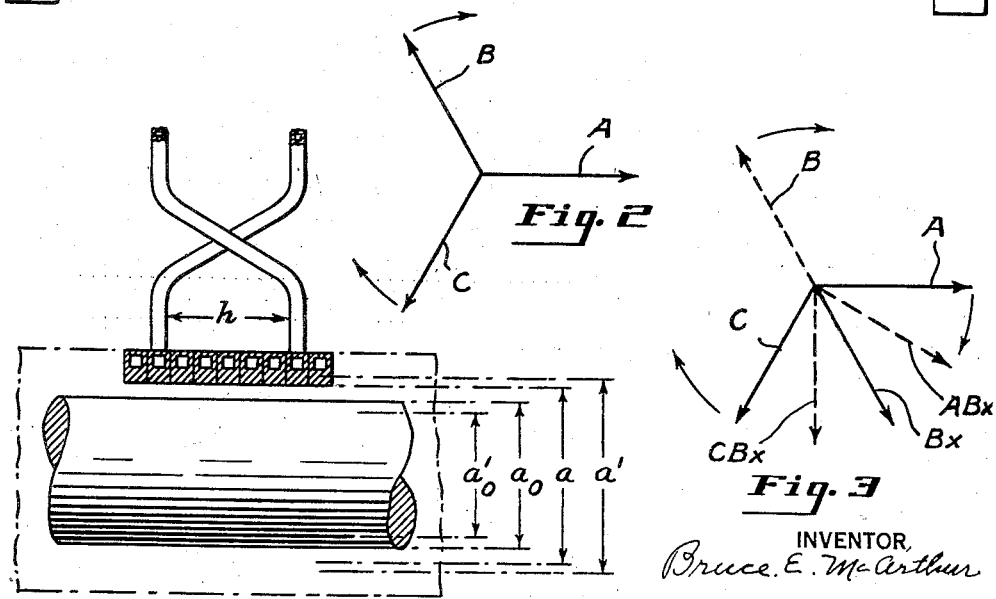
Fig. 2
Fig. 3
Fig. 4
INVENTOR,
Bruce E. McArthur
BY Slough & Slough,
His ATTORNEYS.

June 10, 1958  B. E. McARTHUR  2,838,641
INDUCTION HEATING SYSTEMS
Filed Jan. 27, 1955  2 Sheets-Sheet 2
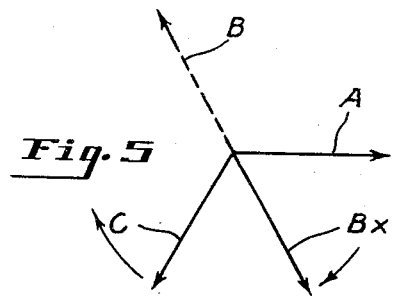
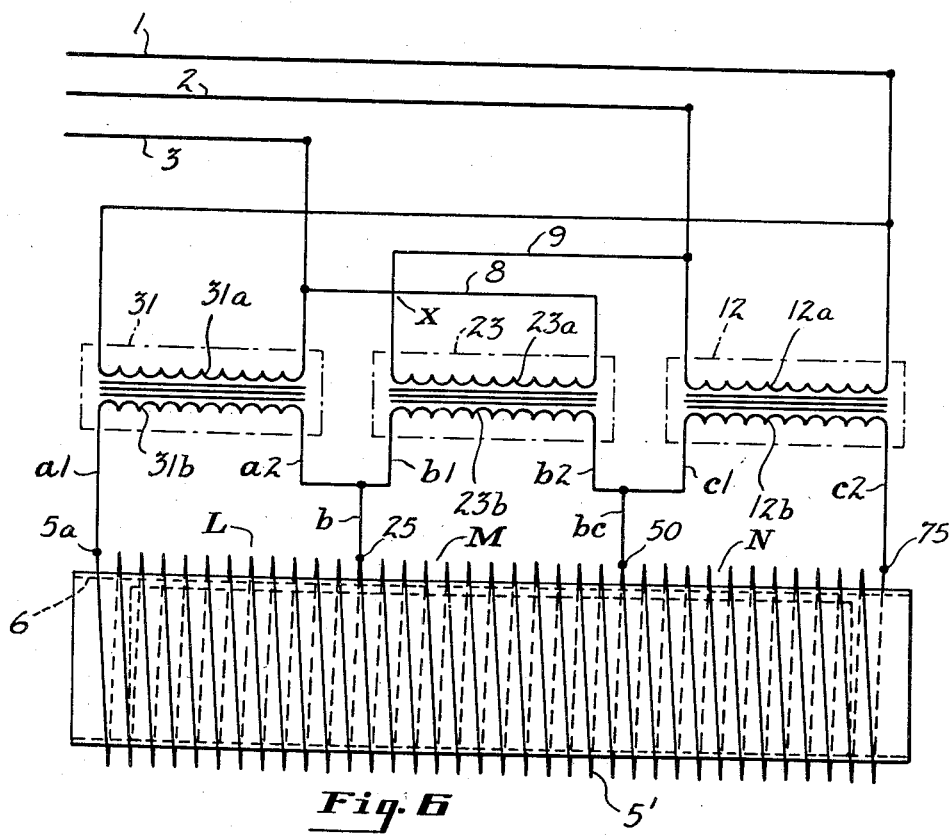
INVENTOR
Bruce E. McArthur
BY Slough & Slough,
His ATTORNEYS

United States Patent Office 2,838,641
Patented June 10, 1958

2,838,641

INDUCTION HEATING SYSTEMS

Bruce E. McArthur, Youngstown, Ohio, assignor to Magnethermic Corporation, Youngstown, Ohio, a corporation of Ohio Application January 27, 1955, Serial No. 484,400

6 Claims. (Cl. 219—10.75)

My invention relates to induction heating systems of the general type wherein an inductor, which surrounds a metal work-piece, is concurrently energized by a plurality of flows of alternating currents which differ in phase and are derived from a multi-phase source of electrical power.

More particularly, my invention involves improvements to the electrical induction systems which are respectively disclosed in United States Letters Patent No. 2,676,234 dated April 20, 1954, and in my copending application for United States Letters Patent, Serial No. 303,342 filed July 29, 1952, now Patent No. 2,748,240.

In my aforesaid copending application, the electrical system disclosed involves a reversal in the direction of flow of electrical current directed through an intermediate of three longitudinally successive inductor coils, each of which according to the preferred form of the invention is composed of a series of helical convolutions of an inductor winding. This arrangement is superior to that disclosed in the aforesaid patent to Lackner et al., No. 2,676,234, in that the phase of magnetomotive force, produced by current directed through the intermediate of said three coils, by virtue of a reversal of a pair of current feed conductors leading thereto, differs from the phases of magnetomotive force respectively produced by currents directed through each of the other coils, by a phase angle of 60°, whereby the three fields of magnetomotive force which are concurrently produced by separate current flows directed through the three said coils would respectively correspond in phase timing to three successive of the six phases of a six-phase periodic system.

Therefor, portions of the flux produced by adjacent end portions of a pair of successive of said coils were caused to be more closely in phase, and dispersal of flux due to so-called "bucking" was considerably reduced, and the flux density within the regions embraced by any such pair of adjacent end portions of successive coils, was substantially increased.

The use of annular insulating spacers between the ends of adjacent coils have been deemed neccessary, in the system of said prior patent and also in the system of said pending application, because of the voltage difference between adjacent convolutions of successive coils, and the flux density in the portions of the heating compartment which are surrounded by said insulators is lessened as the result of the absence of energized inductor convolutions surrounding such compartment portions, this effect being in addition to the bucking effect of adjacent fields of flux which, while reduced, is still effective to a substantial degree.

My present invention, as disclosed in different embodiments, provides for more uniform heating of all portions of the length of work-piece material which is surrounded by the inductor, than has heretofore been found practical in polyphase induction heaters of the general type exemplified by the disclosures of the aforesaid pending application and prior patent.

This is accomplished to different degrees in the different embodiments of my invention as the results of improvements present in the electrical systems disclosed herein, and in both of which, preferably, a continuous convoluted conductor, without space-wasting insulators interposed at intervals along the length of the inductor, is employed to enable all portions of said length to be so energized as to improve the uniformity of heating the work-material throughout its length; the feature of reversely directing current through an intermediate portion of the length of the inductor for reasons set forth in said pending application for patent, being also employed in said embodiments.

Another salient improvement of the present invention is herein more specifically defined being termed, for convenience, as "phase-overlap" and applies to the provision of relatively short longitudinally extending zones of the continuous convoluted inductor winding which are respectively interposed between an intermediate of several longer main zones and respective of the other pair of said long main zones.

In each said short zone currents of the different phases which energize the adjacent main long zones are merged to produce a resultant current, whose instantaneous values are the algebraic sum of the concurrent instantaneous values of the merged currents, and the resultant phase of said resultant current is preferably medial of the phases of current flowing in said adjacent main long zones.

Hereinafter, by vector diagrams and description of examples, the phase relationship and lengths of the short zones, therein called regions of "phase-overlap" will be more specifically explained. At this point, it may be said that the provision of "phase-overlap" in an inductor primarily energized by currents of three primary phases, may be accomplished in an inductor of the simple type, wherein such inductor consists of a continuously convoluted conductor, affording taps at appropriate points of its length, for connection of such points to the input single phase conductors, to provide for substantially uniform and efficient heating of the work-piece material which is surrounded by the inductor.

In the typical inductor employing phase-overlap as above described, five fields of magneto-motive force comprising three longitudinally extensive flux fields, with intervening short flux fields, successive of said long and short fields of flux being caused to differ in phase by only thirty degrees, in a manner whereby all portions of the radially inwardly disposed work-piece will be heated uniformly.

An object of my invention is to achieve the above described results without increasing the cost of construction of the induction heater unit, but on the contrary, the over-all cost of the inductor may be decreased, as a result of causing the inductor winding to be of one continuous convoluted length from end to end of the inductor.

Another object of my invention is to heat a contained work-piece by currents differing in phase directed through a tubular inductor consisting of a single winding consisting of continuous convoluted conductor.

Another object of my invention is to provide a tubular inductor of the general type hereinbefore identified which is adapted to inductively heat metal work-piece material placed within said tubular inductor winding in such a manner that all portions of the length of said inductor are more uniformly heated than has previously been possible, through the use of a multiplicity of current flows which differ between themselves in their phase relationships, in an improved manner.

Another object of my invention is to achieve the heating of work-pieces within a tubular inductor energized by a plurality of flows of different phases of alternating currents more efficiently than has been the practice.

Another object of my invention is to provide a novel electrical system for an induction heater of the general type described wherein a greater number of magneto-motive forces of sequential phases are produced by a lesser number of current flows of sequential single phases, such currents being derived from three-phase supply mains, through the expedient of "phase-overlap," which are applied to short longitudinally extending zones of the inductor, which are respectively located between pairs of longer zones thereof.

Another object of my invention is to provide an improved method of energizing the inductor, for an electrical induction heater of the class described, by directing thereto currents of different primary phases which are so allocated to portions of the inductor as to produce "phase-overlap" in interspaced short portions of the inductor winding, for achieving uniform heating of the work-piece material surrounded by said inductor.

Other objects of my invention and the invention itself will become more apparent to those skilled in the art to which my invention appertains by reference to the following drawings, in which drawings different embodiments of my invention are shown, and to the accompanying specification in which reference is made to the said drawings.

In the drawings:

Fig. 1 is a side elevational view of an inductor coil of the cylindrical tubular type and also shows, diagrammatically, the electrical system which is a preferred embodiment of my invention, a portion of the inductor being shown as broken away to present a view of an end portion of a metal billet work-piece which is surrounded by the inductor and other parts of the unit;

Fig. 2 is a vector diagram showing the phase relationships between the three phases of a three-phase periodic system such as that of the current supply source, which is represented by the power mains shown in Fig. 1;

Fig. 3 is another vector diagram applicable to phasing relationships produced in the operation of systems such as that illustrated in Fig. 1;

Fig. 4 is a drawing illustrating the phenomena of "phase-overlap," as such term is employed in that portion of the description which relates to the system of Fig. 1;

Fig. 5 is a third vector diagram relating to phase relationships of magnetic flux which are present in the operation of the systems of both Figs. 1 and 6;

Fig. 6 is a diagram illustrative of a second embodiment of my invention.

Referring now to the drawings and first, more particularly to Fig. 1, wherein a substantially cylindrical inductor 5 is shown, the inductor 5 preferably consists of a continuous helical winding of a single length of copper conductor, which is preferably provided with a water passage 5a extending for the full length of the winding from end to end of the inductor.

The inductor convolutions 5b are wound over a substantially cylindrical metal tube 6 preferably of a non-magnetic stainless steel material which is resistant to high temperatures, and preferably may be double-walled (not herein shown but as disclosed in my co-pending application for United States Letters Patent, Serial No. 379,389 filed September 10, 1953 now Patent #2,781,437), the said tube containing one or more longitudinally extending, narrow, and transversely electrically non-conductive seams, such as that indicated at 7, which cause the tube 6 to be electrically discontinuous in the circumferential direction, so that it will not be objectionably heated by circumferential currents induced therein.

In order to keep all portions of the hollow wound conductor 5 cool during the operation of the heater, water may be continuously passed into, and withdrawn from, different portions of the length of such conductors and this may be done in any suitable manner, such as that fully disclosed in the aforesaid Letters Patent to Lackner et al., No. 2,676,234.

The foregoing will be understood to apply to the embodiments of Figs. 1 and 6, although Fig. 6, being relied upon to show an electrical system, does not show details of mechanical structure which, however, may preferably be like that of Fig. 1; essentially the only intended difference between the two embodiments resides in the different manner in which electrical connections are made between like secondary windings of the set of three like transformers and taps of inductor winding convolutions of the heater; consequently like reference characters are employed to designate like elements in both figures, different reference characters being employed to indicate differences.

With respect to the power input portion of the electrical circuits, which includes the incoming delta type of three phase power mains 1, 2 and 3 and the connections thereof to the primary windings $31a$, $23a$, and $12a$ respectively of preferably different transformers 31, 23 and 12, the systems of Figs. 1 and 6 are alike in the manner in which each of said transformer windings are respectively energized by currents of different single phases, derived from the said power mains.

The connections of the power mains to the primary windings $12a$ of transformer 12, and $31a$ of transformer 31, are symmetrically made to ensure that the phase relation between the phases of current directed through these primary windings corresponds in relative timing to the phase relation between the magneto-motive forces which are produced by energization of the respective inductor portions N and L, by currents induced in the associated secondary windings $12b$ and $31b$, of these respective transformers 12 and 31, and which currents are respectively directed through the said inductor portion N by conductors $c1$ and $c2$, and through the inductor portion L, by conductors $a1$ and $a2$.

Graphically, such relation of the aforesaid pair of related phases corresponds to that of the respective phases indicated at A and C in the vector diagrams of Figs. 3, 2 and 5, i. e. the phase difference is 120°, and therefore the magnetic flux produced by excitation of the inductor portion N leads in phase, the phase of that produced by excitation of the inductor portion L, by 120° this phase difference applying to both Figs. 1 and 6, reference being had to the flying arrows of these graphs for the assumed direction of phase sequence.

Notice is taken that in Fig. 1 relatively short longitudinally extending inductor portions $h1$ and $h2$ are not included in the above description, explanation relating to these short portions being reserved for later consideration herein.

The above does not include mention of energization of the medial long inductor portion M, as indicated in Figs. 1 and 6, at M, whose energization is accomplished in a manner electrically equivalent to that of the middle coil of the three coil inductor winding of my aforesaid pending application for patent, to wit: by reversal of the direction of flow of current which through the transformer 23 is directed through the medial inductor. Such reversal of current flow, is here, preferably effected by transposition of the pair of infeed conductors 8 and 9, which lead to the primary winding of the transformer 23, as indicated at X, whereas, in my said prior application, transposition of the pair of conductors leading from the secondary transformer winding to the said medial inductor winding are transposed.

However, although the conductors $b1$ and $b2$ could be transposed as in the former case, and both methods are suggested in the specification of my former application for patent, it has been found desirable instead, for practical reasons, to transpose the infeed conductors 8 and 9 which conduct current from the power mains 2 and 3 to the primary transformer winding $23a$ to achieve the same purpose of relatively reversing the phase of magnetomotive force set up by excitation of the long inductor portion M.

Reversal of the phase of such magnetomotive force resulting from energization of the inductor portions M, in Figs. 1 and 6, is diagrammatically illustrated in Fig. 5 where the relations between the phases of magnetomotive forces set up respectively, by energization of the wound inductor portions N, M and L, are in sequence indicated by the solid lines A, Bx and C respectively, whereas if no transposition X of conductors 8 and 9 were not provided these phase relations would be shown by the lines A, C and B, the line B being dotted in Fig. 5 but shown as solid in Fig. 2.

In both the systems of Figs. 6 and 1, by virtue of the transpositions of conductors at X, the phase of magnetomotive force exerted within the inductor winding portion M, as indicated by Bx, in the vector diagrams of Figs. 3 and 5 leads that of the phase of magnetomotive force exerted within the inductor portion N, indicated at A by 60° and lags behind that of the phase of magnetomotive force exerted within the inductor portion C by 60°.

The system of Fig. 6 differs from that of my said prior application, first by reversal of current feed connections to the transformer primary winding 23a and more importantly in that a conductor a2 leading from an end of the secondary transformer winding 31b and a conductor b1 leading from the secondary transformer winding 23b are joined, and are connected by a conductor b to a connector tap 25, of a single convolution of the inductor winding which is convolutely continuous throughout the length of the inductor and similarly a conductor b2 leading from the opposite end of the secondary winding 23b, and a conductor c1 leading from the secondary transformer winding 12b are joined, and are connected by a conductor bc to a connector tap 50 of a single convolution of the said inductor winding.

The said taps are preferably so disposed along the length of the inductor as to provide that as least as many convolutions may be disposed between each said tap and the nearest end of the inductor as are disposed between the taps. By making the inductor of Fig. 6 of a single convoluted conductor and applying the secondary windings of transformers 31, 23 and 12, to taps of the conductor as above described, the relatively high voltage previously present between the adjacent ends of successive separate windings of the inductor is not present as it is, in the case of the three-coil inductors of the previously identified patent to Lackner et al., or in the case of the three-coil inductor of my aforesaid pending application for patent, in both of which insulating separators were required to be interposed between said winding ends, and the arrangement of the electrical system of Fig. 5, not requiring such separators is productive of substantially more inductive heating effect in the regions disposed radially within the portions of the inductor which were formerly occupied by such insulators.

Additionally, the heating inductor is more readily and more economically constructed than was the case of those above cited as requiring such spacing insulators.

The system of Fig. 1 represents a very important advance in the art of induction heating through the use of inductors of the class to which my invention appertains. Its salient feature, aside from incorporating the advances present in the system of Fig. 6, is in the method and system involving the "phase-overlap" feature which has proved to be productive of startling results connected with the inherent capability of applying a plurality of three or more flows of single phase currents to an induction heater winding in such a way as to avoid longitudinal gaps between groups of inductor convolutions fed with currents of different phases, and to ensure that the work-piece material surrounded by the inductor convolutions is heated to a substantially uniform degree at a substantially uniform rate throughout the entire length of the said material, which commonly is in the form of a metal billet or of a succession of such billets, although such material may depart widely from the form and character of billets with equivalent results.

Phase overlap, with a continuous convoluted inductor as achieved in a now preferred embodiment, and as shown for purpose of example in Fig. 1, may provide an interior cylindrical heating compartment within which the work-piece material may be telescoped from one open end, and may be heated therein and subsequently ejected from either open end, such as in the manner disclosed in the cited patent to Lackner et al.

Generally, the inductor of the exemplary Fig. 1 may be said to have three main, longitudinally extending inductor portions L, M and N, the medial of which at M, being fed with current of an intermediate phase and the right hand portion N being fed with a current of a relatively leading phase, with the left hand portion L fed with a current of a relatively lagging phase, such phases being separately derived from three phase power mains such as those at 1, 2 and 3 in the same manner as previously described with first emphasis on the system of Fig. 6, the primary and secondary windings of transformers 31, 23 and 12, being utilized as before described to communicate currents of the three single phases, corresponding to those supplied by said mains to the said inductors.

The described transposition at X is effective in the described manner to reverse the phase of magnetomotive force which is set up by energization of the medial main inductor portion M, and for purpose of lessening the phase angles between the phased magnetomotive forces set up by said medial main inductor portion and each of the end-most inductor portions N and L, from 120° to 60°, as in the system of my aforesaid application for patent.

At Y and at Z the conductors of each of two pairs $a2$—$b1$ and $b2$—$c$, are transposed so that the conductors $b1$ and $b2$ which extend from opposite terminals of the secondary winding 23b of the intermediate transformer 23 not only embrace between them, the convolutions between taps 27 and 48, but also convolutions in the short longitudinally extending inductor zones $h1$ and $h2$; at the same time, the conductors $a1$ and $a2$ embrace between them, not only the long main inductor portion L but also embraces the short longitudinal zone $h1$, and the conductors $c1$ and $c2$ embrace both the long main inductor portion N and also the short inductor portion $h2$.

Thus there is an overlapping by the pairs of conductors $b1$ and $b2$ leading from the secondary winding 23b of transformer 23 of the short zones $h1$ and $h2$, and concurrent overlapping by the conductors $a1$ and $a2$ leading from the secondary winding 31b of the transformer 31 of one of the short zones $h1$ and by the conductors, and concurrently the conductors $c1$ and $c2$ leading from the secondary winding 12b of transformer 12, overlap other short zone $h2$.

Thus assuming that the illustrated inductor is made up of 75 winding convolutions, the secondary winding 12b of the transformer 12 is connected to deliver energizing current of a phase A of Fig. 2 to the first group of twenty-seven convolutions (counting from right to left), the secondary winding 23b of transformer 23 concurrently delivers energizing current of a phase B of Fig. 2, to the middle group of twenty-seven convolutions including the three shown at $h2$ which are also energized by current of phase A, and the secondary winding 21b of transformer 31 concurrently delivers current of a phase C of Fig. 2, to the last twenty-seven convolutions including the last three of those shown at $h1$ which are also energized by current of phase B.

Now, although the three phases of current supplied to convolutions of the inductor, are timed in the order of phases A, C and B, as indicated by the vector diagram of Fig. 2, by virtue of the transposition of conductors 8 and 9 of Fig. 1, the phase relations of magnetomotive forces set up by currents of these phases are changed by the fact that the transposition at X, Fig. 1 shifts the phase of magnetomotive force set up in the middle main portion M of the inductor 180° so that current of phase B traversing the convolutions of said portion sets up a magnetomotive force displaced 180° from the angular position of B shown in Fig. 2 and which is also indicated in Fig. 5 by dotted lines, to the solid line angular position of phase B$x$ in Fig. 5.

Considering that the other phases of magnetomotive forces due to energizing currents of phases A and C, are respectively shown by the lines A and C of Fig. 5, the magnetomotive force of phase B$x$, produced by reversed energization of the middle inductor zone M, now becomes so placed 60° between phases A and C as to provide a phase sequence proceeding clockwise of the diagrams of Figs. 5 and also of Fig. 3, later herein referred to, of the three phases A, B$x$ and C with a 60° phase or time angle between the phases A and C of magnetomotive forces respectively set up by energization of the respective portions N and L.

The inductor regions of overlap $h1$ and $h2$ comprising short longitudinal relatively interspaced portions of thee inductor, and each comprising three conductors, are respectively energized by merger of currents of two sequential phases one of which, in each of the regions $h1$ and $h2$, being reversed current of phase B which sets up magnetomotive force of phase B$x$, Figs. 5 and 3.

In the region $h2$, the other merged current is that fed thereto from the transformer 12, which sets up magnetomotive force of phase A. The instantaneous values of magnetomotive forces of phases B$x$ and A, whose relative phase displacement is 60°, when merged in region $h2$, are algebraically added to produce an intermediate phase of magnetomotive force which is vectorially shown at AB$x$, in Fig. 3 and whose relative phase displacement is only 30° from each of the merged phases A and B$x$.

Therefore, the phase displacement between any successive of the phases A, AB$x$, B$x$, C$bx$ and C is only 30 degrees and proceeding from the right to the left end of the heating compartment, the above succession of phases of magnetomotive forces are respectively in order exerted, each in a different of the successive right-to-left zones N, $h2$, M, $h1$ and L, with a constant displacement of 30° between each pair of successive phases. These phases being in phase sequence ensure that a "travelling field" of magnetic flux, as disclosed in the previously identified prior patent and pending application, will prevail to effect a magnetic thrust acting upon the work-piece material disposed within the convolutions of the successive longitudinal zones N, $h2$, M, $h1$ and L, to move the same when such movement is not restrained, towards and through the left hand opening of the heating compartment.

Fig. 4 is a diagram of a region of overlap such as either of those shown in Fig. 1 at $h1$ and $h2$, presented for the purpose of aiding in the following description of the manner in which the longitudinal extent of such regions of phase overlap and the number of inductor convolutions, may be calculated for effectively practicing the use of overlapped phases in variant embodiments of my invention in any region of overlap "$h$," of two consecutive phases of magnetomotive forces set up by a pair of longitudinally successive portions such as those at L and M, or M and N.

The portion that is energized or the length of coil that is overlapped by the two phases depends upon the following factors:

A. The phase relationship between consecutive phases, i. e. the phase angles between the voltage phasors.

B. The material constants of the coil conductors, and the charge within the induction coil. The constants are in particular resistivity and permeability.

C. The frequency of the applied voltages.

D. The physical dimensions of the induction coil and the charge within the coil, in particular, the inside diameter of the coil and the outside diameter of the charge.

E. The current depth of penetration of the coil conductor and the charge.

In the case of a three phase supply with the phase relationship as shown in Fig. 2, the following detailed calculation is made to determine the longitudinal extent of such a region of phase overlap when two consecutive phases of current energizing an induction coil, containing a charge 11, are merged.

In Fig. 4, the inside diameter of the induction coil is indicated at $a$, and $a_o$ indicates the outside diameter of the charge 11. The current penetration into the coil conductor is given by the following equation:

$$(1) \qquad d_1 = 3160\sqrt{\frac{P_1}{fs}}$$

where, $P_1$ is the resistivity of the coil conductor in ohm inches, $f$ is the frequency in cycle per sec. of applied voltage to the coil conductors and $s$ being the resultant space factor, obtained by dividing the width of the copper conductor, whose convolutions provide the conductor of the inductor and more particularly those convolutions contained in the zones $h1$ and $h2$, by the total width of said insulated conductor which, will give a result which will be somewhat less than unity, depending on the thickness of the insulation which is applied to said conductor, in any suitable manner, one such being disclosed, as to principle, in the prior previously mentioned patent to Lackner et al. No. 2,676,234.

The current penetration $d_2$ into the charge is given by the following equation $$(2) \qquad d_2 = 3160\sqrt{\frac{P_2}{uf}}$$

where $P_2$ = the resistivity of the charge 11 in ohm inches
$u$ = the permeability of the charge (pure number), and $f$ = the frequency of current in cycles per second.

Then, $a^1$, the effective inside diameter of the coil, is given by the following equation:

$$(3) \qquad a^1 = a + d_1$$

and $a^1{}_o$ will be the effective outside diameter of the charge and is given by the equation:

$$(4) \qquad a^1 = a + d_1$$

In Equations 3 and 4, $d_1$, $a$, $a_0$ and $d_2$ will be given in inches, hence $a^1$ and $a^1{}_0$ will be in inches.

The phase overlap $h$ will then be given by the concluding equation:

$$(5) \qquad h = \frac{a^1 - a^1{}_o}{2}$$

To illustrate the above the following examples are given:

I. Three phase supply with phase relationship as in Fig. 1. Coil conductor will be copper. Charge 11 will be aluminum.

Inside diameter of coil____ $a = 7.854''$
Outside diameter of charge__ $a_o = 7.000''$
Resistivity of Cu_____ $P_1 = .8 \times 10^{-6}$ ohm inches
Resistivity of aluminum____ $P_2 = 2.24 \times 10^{-6}$ ohm inches
Permeability of aluminum__ $u = 1$
Frequency_____ 60 cycles per second
Space factor_____ $s = 0.92$ inches Hence from Equations 1 and 2:

$d_1 = .38$ in. and $d_2 = .611$ in.

Then from Equations 3 and 4:

$$a^1 = a + d_1$$
$$a^1 = 7.875 \text{ in.} + .380 \text{ in.}$$
$$a^1 = 8.255 \text{ in.}$$
$$a^1_o = a_o - d_2$$
$$a^1_o = 7.000 \text{ in.} - .611 \text{ in.}$$
$$a^1_o = 6.389 \text{ in.}$$

Hence the phase overlap $h$ from Equation 5 is found to be:

$$h = \frac{a^1 - a^1_o}{2} = \frac{8.255 - 6.389}{2} = .933 \text{ in.}$$

Therefor, under the above conditions, the phase overlap $h = .933$ inches.

In applying the same to a practical case, one should approximate the phase overlap, in number of overlapped convolutions, in term depending upon the turn width of the coil conductor and the insulation thickness that is used. From a coil construction viewpoint, it is preferably best to use full turns for the overlapped region, hence the value for $h$ as calculated may only be approximate, instead, the amount of phase overlap in terms of an integral number of turns approximately equal to the calculated phase overlap would ordinarily be preferred.

In this particular case, the turn width including insulation is $t_w = .407$ inch. Hence if three turn widths are used $$h^1 = 3 \times .407 \text{ in.} = 1.221 \text{ in.}$$

which is greater than the calculated value of $h$ ($=.933$ in.) by .288 inch.

If two turn widths are used $h^1 = 2 \times .407$ in. $= .814$ in. which is less than the calculated $h$ ($=.933$ in.) by .119 in.

Since two turn widths hence will give a value close to that desired, two turn widths may be used.

Further example:

| Aluminum | | | Brass | | |
|---|---|---|---|---|---|
| Billet Dia., in. | Coil I. D., in. | Phase Overlap, in. | Billet Dia., in. | Coil I. D., in. | Phase Overlap, in. |
| 7.000 | 7.875 | .993 | 7.000 | 8.340 | 1.340 |
| 10.000 | 11.000 | .995 | 10.000 | 11.530 | 1.530 |

The above calculation is based on the above assumption that the phase difference between currents of the successive single phases by which respective of the inductors are excited is that described for the three phase system upon which said calculations are based.

For other variant embodiments where the phase difference between currents fed to the successive inductor coil portions is different than is the case of the system of Fig. 1, if the amount of phase overlap in such case is caused to be in the inverse ratio existing between the respective cosines of the respective phase angles, advantageous results, resulting from my invention, may be achieved.

Having thus described my invention in two embodiments and set forth the means of employing the principles thereof in still other embodiments, I am aware that numerous and extensive departures may be made from the herein disclosed, described and claimed subject matter, without departing from the spirit of my invention and the scope of the appended claims.

I claim:

1. The electrical system for induction heaters of the type described, comprising an inductor consisting of a continuous succession of helical convolutions, of an electrically continuous electrical conductor, which surround an elongated tubular heating compartment within which metal work-piece material may be inductively heated by currents induced therein, said system being energized from a polyphase source of power, transformer means for deriving from said source a plurality of flows of single phase currents which are of different sequential phases, a plurality of pairs of conductors, one for each of said single phase flows, a first said pair of conductors arranged to direct current of a first phase to a first of a plurality of longitudinally successive groups of said inductor convolutions, and a second pair of said conductor pairs being arranged to direct current of a relatively second phase to a second group of said convolutions, said first group extending from one longitudinal end of the inductor towards its other end and said second group extending from one of the convolutions of the extended end region of said first group and including, in common with said first group, a plurality of endmost convolutions, of said first group and also a substantially greater number of convolutions disposed successively towards the opposite end of the inductor, the number of convolutions in both said groups being substantially equal, and said convolutions which are common to both said groups being simultaneously energized by two merged currents of different phases, the merger of said currents producing a current in said common convolutions whose phase is medial with respect to the phases of current conducted by said first and second pairs of conductors to said convolutions of the said first and second groups.

2. The electrical system for induction heaters comprising an inductor comprising a plurality of successive winding convolutions, of an electrically continuous conductor, which jointly provide a helix which surrounds a tubular heating compartment within which metallic work-piece material may be disposed for inductive heating thereof, a source of three electrical currents which are respectively of three sequential single phases, a series of three pairs of conductors for separately communicating currents of each of said phases to different pairs of convolutions of the inductor, the selected convolutions of the inductor to which conductors of said three pairs are connected, being six in number, and are respectively located in successive interspaced relation to each other along the length of the inductor proceeding from a selected convolution at a first end portion of the inductor towards the opposite end portion thereof, the conductors of the first pair being respectively connected to the first and third of said selected convolutions, the conductors of the second pair being respectively connected to the second and fifth of said selected convolutions, and the conductors of the third pair being respectively connected to the fourth and sixth of said selected convolutions.

3. The electrical system for induction heaters of the tubular inductor type wherein metal work-piece material is surrounded by successive convolutions of the inductor, comprising in combination with three sources of different single phase currents of respectively different sequential phases, a pair of conductors leading from each said source to the inductor to communicate current from each said source to respectively selected inductor convolutions which are individually disposed, starting at one end of the inductor and terminating at the opposite end thereof at longitudinally separated successive intervals, proceeding in the same direction along the length of the inductor, a connection tap at each of said respective selected convolutions, a first and a sixth of said taps being respectively affixed to convolutions at the opposite end portions of the inductor, conductors of the first said pair being respectively connected to the first and third of said taps, conductors of the second said pair being respectively connected to the second and fifth of said taps, and conductors of the third said pair being respectively connected to the fourth and sixth of said taps.

4. In an electrical system for an induction heater of the tubular induction type wherein work-piece material is surrounded by successive convolutions of an electrical conductor extending from end to end thereof, a pair of charging conductors for interconnecting the primary winding of each transformer with single phase taps of a source of three-phase power, each pair of said charging conductors communicating, to its associated primary transformer winding, an alternating current of a different phase from the currents communicated to the other primary windings by their associated pairs of charging conductors, a pair of distributive conductors extending from the terminals of the secondary winding of each said transformer to different groups of successive of said inductor convolutions to make connections at connection taps thereof, said tap connection being made at longitudinally separated successive intervals proceeding in the same direction along the length of the inductor, a first pair of distributive conductors extending from the secondary winding of a first transformer being respectively connected to the first and third of said taps, distributive conductors extending from a secondary winding of a second said transformer being respectively connected to the second and fifth of said taps and distributive conductors extending from the secondary winding of the third transformer being respectively connected to the fourth and sixth said taps, one pair of the pairs of charging and distributive conductors respectively connected with the primary and secondary windings of said second transformer being so reversed relative to the manner of connecting the primary windings of the other transformers to the said source of three phase power and to the pairs of taps on said inductors, as to relatively reverse the phase of magnetomotive force set up by energization of the convolutions located between said third and fourth taps.

5. An electrical system for an induction heater for metal workpieces, comprising an inductor surrounding a substantially elongated tubular heating compartment for receiving the workpieces to be heated by eddy currents induced therein, said system being fed from a polyphase source of low-frequency electrical power, from which a plurality of separate alternating current single phase flows of sequential phases are derived, said inductor comprising a longitudinally disposed succession of groups of conductive convolutions, which are electrically continuous portions of a conductor, and are respectively disposed in longitudinally successive zones of the inductor, a shorter of said zones containing relatively fewer of said convolutions being disposed between two longer zones containing relatively more of said convolutions, the convolutions in the two said long zones being energized by different of said single phase current flows, which are respectively of sequential phases, and the convolutions in the relatively intermediate shorter zone being concurrently energized by merged single phase alternating currents derived from each of the said single phase flows of sequential phases.

6. The electrical system for energizing an induction heater for metal workpieces comprising an inductor surrounding a substantially elongated tubular heating compartment for receiving the workpieces to be heated, said inductor comprising successive inductor convolutions which are disposed in groups occupying successive longitudinally extending zones of the inductor, said system comprising a three phase source of power for energizing the inductor and from which three relatively separate single phase currents of different sequential phases are derived, each of three pairs of conductors being provided to separately communicate a single phase current to selected convolutions which are relatively interspaced longitudinally of the inductor, from one end to the opposite end thereof, a first of said conductor pairs being connected to a first and third of said convolutions, a second of said conductor pairs being connected to a second and a fifth of said convolutions, and a third of said conductor pairs being connected to a fourth and a sixth of said convolutions, and there being a relatively greater number of convolutions between said first and second, between said third and fourth, and between said fifth and sixth of said selected convolutions, than the substantially lesser number of convolutions between said second and third and between said fourth and fifth of said selected convolutions.

References Cited in the file of this patent

UNITED STATES PATENTS

| 600,228 | Kurda | Mar. 8, 1898 |
| 2,623,081 | Schorg | Dec. 23, 1952 |
| 2,669,647 | Segsworth | Feb. 16, 1954 |
| 2,676,234 | Lackner et al. | Apr. 20, 1954 |
| 2,720,576 | Lackner | Oct. 11, 1955 |
| 2,748,240 | McArthur | May 29, 1956 |

FOREIGN PATENTS

| 282,208 | Switzerland | Apr. 15, 1952 |

OTHER REFERENCES

"Induction Heating," by N. R. Stansel, published by McGraw-Hill Book Co., 1949, pages 61 and 62.